United States Patent
Fujii et al.

(10) Patent No.: US 9,970,546 B2
(45) Date of Patent: May 15, 2018

(54) SEAL STRUCTURE AND SEAL METHOD

(71) Applicant: HONDA MOTOR CO., LTD., Tokyo (JP)

(72) Inventors: Daisuke Fujii, Wako (JP); Daijiro Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/334,293

(22) Filed: Oct. 26, 2016

(65) Prior Publication Data

US 2017/0130842 A1   May 11, 2017

(30) Foreign Application Priority Data

Nov. 6, 2015   (JP) .................. 2015-218811

(51) Int. Cl.
F16J 15/02   (2006.01)
F16J 15/06   (2006.01)

(52) U.S. Cl.
CPC ........... *F16J 15/024* (2013.01); *F16J 15/061* (2013.01)

(58) Field of Classification Search
CPC .............................. F16J 15/024; F16J 15/061
USPC ......................................................... 277/644
See application file for complete search history.

(56) References Cited

U.S. PATENT DOCUMENTS

| | | | | |
|---|---|---|---|---|
| 4,597,583 A * | 7/1986 | Inciong | .................. | F16J 15/121 277/591 |
| 6,065,757 A * | 5/2000 | Schneider | .............. | F16J 15/024 277/598 |
| 6,981,704 B2 * | 1/2006 | Okazaki | ................. | F16J 15/061 277/638 |
| 2009/0266183 A1* | 10/2009 | Hall | ..................... | F24F 11/0017 73/865.9 |
| 2014/0217680 A1* | 8/2014 | Mori | ..................... | F16J 15/024 277/594 |

FOREIGN PATENT DOCUMENTS

| | | |
|---|---|---|
| JP | 58-124639 U | 8/1983 |
| JP | 07-55006 | 3/1995 |
| JP | 2923180 B2 | 3/1995 |
| JP | 08-028707 | 2/1996 |

(Continued)

OTHER PUBLICATIONS

Japanese Office Action for corresponding JP Application No. 2015-218811, dated May 2, 2017.

(Continued)

*Primary Examiner* — Nathan Cumar
(74) *Attorney, Agent, or Firm* — Mori & Ward, LLP (57) ABSTRACT

A seal structure includes a seal body. The seal body is sandwiched between a case and a cover and provided between a space and fastening regions. The space is formed by the case and the cover. The case and the cover is fastened at the fastening regions to compress the seal body in a compression direction. The seal body includes first regions and second regions. The first regions correspond to the fastening regions. Each of the second regions is provided between one of the first regions and another of the first regions. Reaction force in the compression direction in the seal body located at the first regions is smaller than reaction force in the compression direction in the seal body located in the second regions.

12 Claims, 6 Drawing Sheets

(56) References Cited

FOREIGN PATENT DOCUMENTS

| | | |
|---|---|---|
| JP | 10-009395 | 1/1998 |
| JP | 2008-232167 | 10/2008 |
| JP | 2014-216995 | 11/2014 |

OTHER PUBLICATIONS

Chinese Office Action for corresponding CN Application No. 201610891650.9 (w/English machine translation), dated Jan. 31, 2018.

\* cited by examiner

SEAL STRUCTURE AND SEAL METHOD

CROSS-REFERENCE TO RELATED APPLICATIONS

The present application claims priority under 35 U. S. C. § 119 to Japanese Patent Application No. 2015-218811, filed Nov. 6, 2015. The contents of this application are incorporated herein by reference in their entirety.

BACKGROUND OF THE INVENTION

Field of the Invention

The present invention relates to a seal structure and a seal method.

Discussion of the Background

Japanese Patent Application Laid-Open Publication No. H08-028707 discloses a seal structure in which a print seal is applied to both surfaces between bolt holes of a metal gasket provided in an engine block and the like. In this art, a length and a width of the print seal are different between one surface and the other surface, and a thickness in the direction of compression is varied between the periphery of the bolt hole and the middle between the bolt holes so that a uniform seal pressure is given throughout the whole length between the bolt holes.

Japanese Patent Application Laid-Open Publication No. 2008-232167 discloses a seal structure in which a seal is provided by a gasket between a base and a cover of electronic equipment and the like. In this art, a sealed part of the base or the cover is formed in a concavo-convex shape in the direction orthogonal to the direction of compression of the gasket, so that a compression amount in the orthogonal direction is varied. In addition, the gasket is prevented by the concavo-convex shape from falling down in the orthogonal direction.

SUMMARY OF THE INVENTION

According to a first aspect of the present invention, a seal structure of the type that has a seal member arranged between a case of a casing and a cover of the casing, includes a plurality of fastening regions for fastening the case and the cover, being formed in an outer periphery of the casing. The seal member is arranged inwardly of the casing from the fastening regions. Reaction force in the compression direction of the seal member located in the vicinities of the fastening regions is smaller than reaction force in the compression direction of the seal member located in positions other than the vicinities of the fastening regions.

According to a second aspect of the present invention, a seal method for providing a seal between a case of a casing and a cover of the casing by a seal member. The seal member is arranged inwardly of the casing from a fastening region in which the case and the cover are fastened. Reaction force in the compression direction of the seal member located in the vicinity of the fastening region is smaller than the reaction force in the compression direction of the seal member located in a position other than the vicinity of the fastening region.

According to a third aspect of the present invention, a seal structure includes a seal body. The seal body is sandwiched between a case and a cover and is provided between a space and a plurality of fastening regions. The space is formed by and between the case and the cover. The case and the cover is fastened at the plurality of fastening regions to compress the seal body in a compression direction. The seal body includes a plurality of first regions, a plurality of second regions, and a structure. The plurality of first regions correspond to the plurality of fastening regions, respectively. Each of the plurality of second regions is provided between one of the plurality of first regions and another of the plurality of first regions juxtaposed to the one of the plurality of first regions. Reaction force in the compression direction in the seal body located at the plurality of first regions is smaller than reaction force in the compression direction in the seal body located in the plurality of second regions in a state where the case and the cover are fastened at the plurality of fastening regions.

According to a fourth aspect of the present invention, a seal method includes providing a seal between a case and a cover. The case is connected to the cover with a fastener such that seal body is provided between a space and a plurality of fastening regions. The space is formed by and between the case and the cover. Reaction force in a compression direction of the seal body located in the vicinity of the fastening region is smaller than the reaction force in the compression direction of the seal body located in a position other than the vicinity of the fastening region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereunder, a preferred embodiment of a seal structure according to the present invention will be explained in detail with reference to accompanying drawings. In the following explanation, although the seal structure according to the embodiment of the present invention is assumed to be applied to a casing 10 which accommodates a battery or electronic equipment of a vehicle, the embodiment of the present invention may be applied to other devices. In addition, directions such as upper, lower, left and right used in the following explanation designate relative directions in each of the drawings, and do not designate a specific direction. In other words, the direction of arrangement according to the embodiment of the present invention will not be defined in the seal structure.

Figure 1:
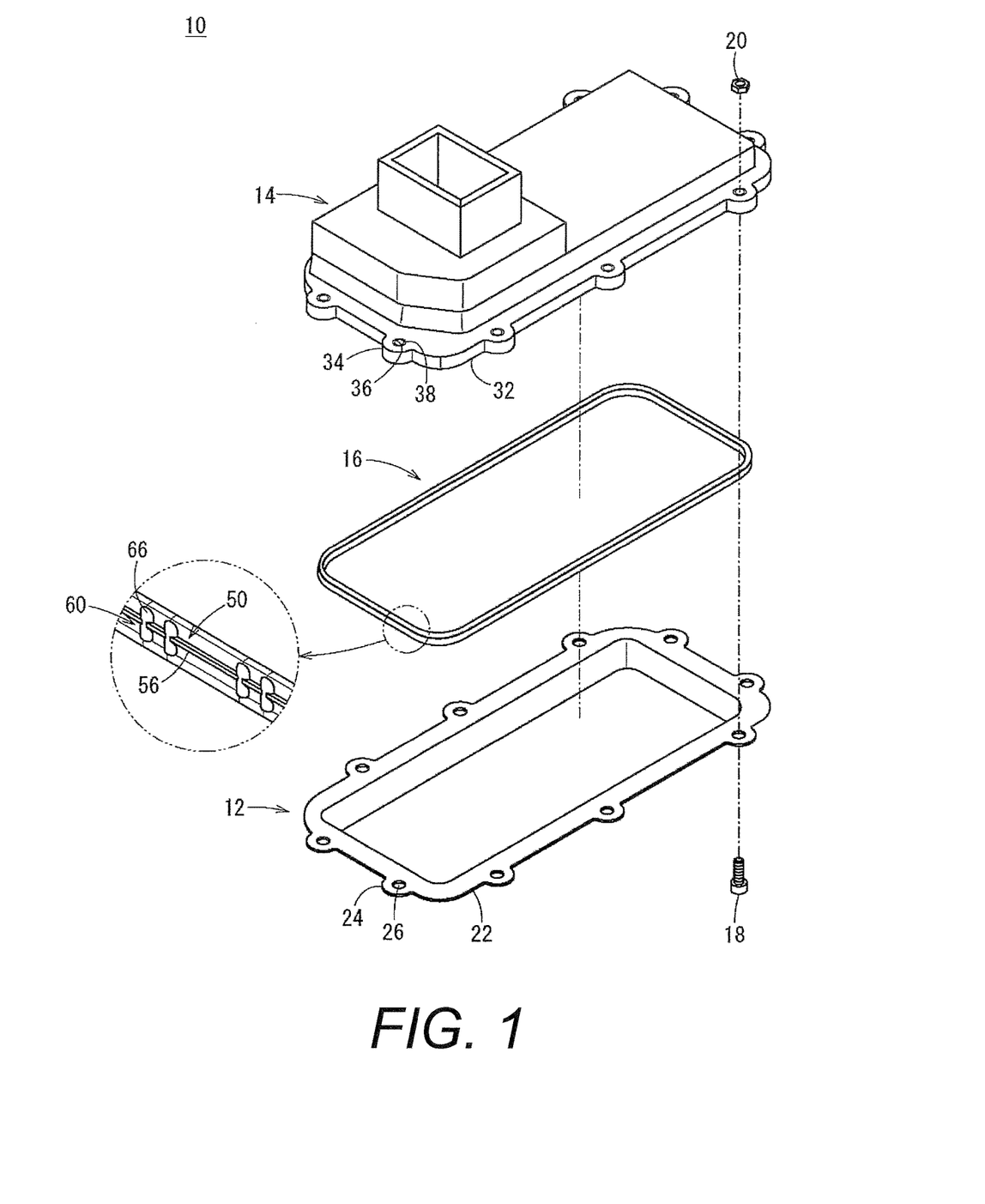
FIG. 1 is an exploded perspective view of a casing in accordance with an embodiment of the present invention.

As shown in FIG. 1, the casing 10 includes a case 12, a cover 14 to be put on the case 12, and a seal member 16 to be arranged between the case 12 and the cover 14. The case 12 and the cover 14 are fastened together by a bolt 18 and a nut 20. Herein, although only a couple of bolt 18 and nut 20 is shown in FIG. 1, the bolt 18 and nut 20 are actually provided in each of fastening portions 40 (see FIG. 2).

The case 12 is made of resin. In an open end portion located in an upper part of the case 12 there is formed a case side flange 22 which circles around the open end portion. A plurality of case side fastening portions 24 are formed in the case side flange 22. The case side fastening portions 24 extend further outwardly from the case side flange 22. Bolt insertion holes 26 are formed in the case side fastening portions 24 so as to pass therethrough in the upward and downward direction.

The cover 14 is made of resin. In an open end portion (not shown) located in a lower part of the cover 14, there is formed a cover side flange 32 which circle around the open end portion. In the cover side flange 32, there are formed cover side fastening portions 34 having the same arrangement and the same number with the case side fastening portions 24. The cover side fastening portions 34 extend further outwardly from the cover side flange 32. Bolt insertion holes 36 are provided in the cover side fastening portions 34 so as to pass therethrough in the upward and downward direction. A boss 38 is press fitted into the bolt insertion hole 36.

Figure 2:
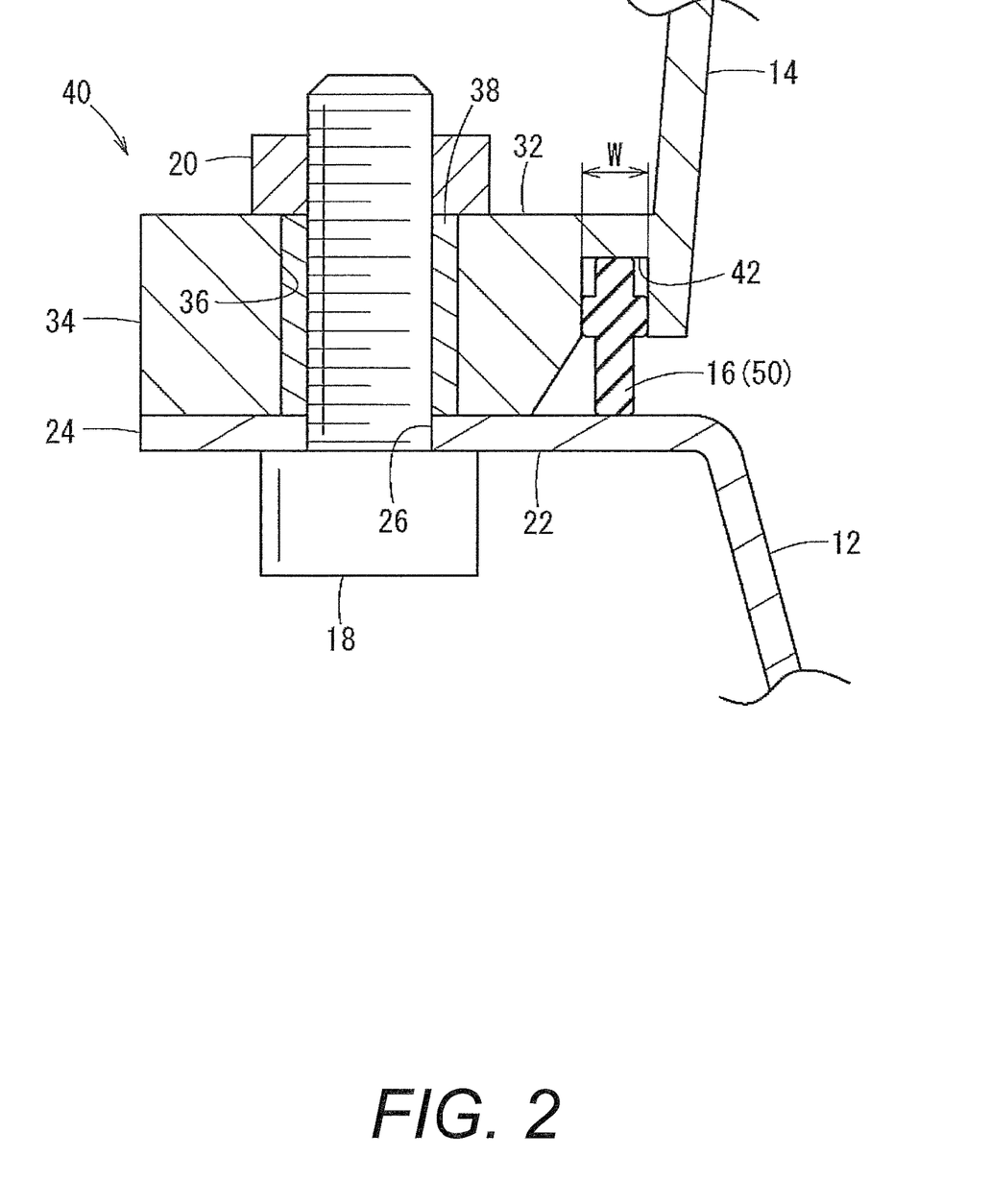
FIG. 2 is a cross sectional view of a fastening region of the casing.

As shown in FIG. 2, the cover side fastening portion 34 is placed on the case side fastening portion 24 in a condition where an axis of the bolt insertion hole 26 is aligned with an axis of a hole of the boss 38. In this condition, a threaded portion of the bolt 18 is inserted from the lower side into the bolt insertion hole 26 and the hole of the boss 38 and projects upwardly from the hole of the boss 38. The nut 20 is mounted on the projecting threaded portion of the bolt 18. Like this, each of the case side fastening portions 24 and each of the cover side fastening portions 34, namely, the case 12 and the cover 14 are fastened together by the bolts 18 and the nuts 20. In this specification, a part consisting of the case side fastening portion 24, the cover side fastening portion 34, the bolt 18, the nut 20 and the boss 38 is referred to as a fastening region 40 (see FIG. 2).

The seal member 16 is made of elastomer (for example, rubber). The seal member 16 has a shape following an outer peripheral shape, herein, a substantially square ring shape of each of the case 12 and the cover 14, and is arranged in an inner part of the casing 10, to put it concretely, on an inward side of the casing 10 relative to the fastening regions 40 as shown in FIG. 2, along the case side flange 22 and the cover side flange 32. A lower end of the seal member 16 makes contact with the case side flange 22, and an upper end of the seal member 16 makes contact with the cover side flange 32. When the case side fastening portions 24 and the cover side fastening portions 34 are fastened together, the seal member 16 is compressed in the direction of the center. This direction is referred to as the compression direction (see FIGS. 3A and 3B). A seal member holding groove 42 having a width W is formed in the cover side flange 32 so as to be located inwardly of the casing 10 from the cover side fastening portions 34. About an upper half of the seal member 16 is held in the seal member holding grove 42, so that misregistration of the seal member 16 at the time of compression can be prevented. Moreover, the seal member 16 can be positioned in a sealing position at the time of assembling the casing 10. Herein, the seal member holding groove 42 may be formed on the case 12 side.

As shown in FIG. 1, a plurality of ribs 66 are formed on an inner peripheral part and an outer peripheral part of the seal member 16 along the circumferential direction. The seal member 16 located in the vicinity of the fastening region 40 is formed only of a rib-less part 50 which is not provided with the rib 66, and the seal member 16 located in a position other than the vicinity of the fastening region 40 is formed of the rib-less part 50 and a ribbed part 60 which is provided with the rib 66.

Figure 3A:
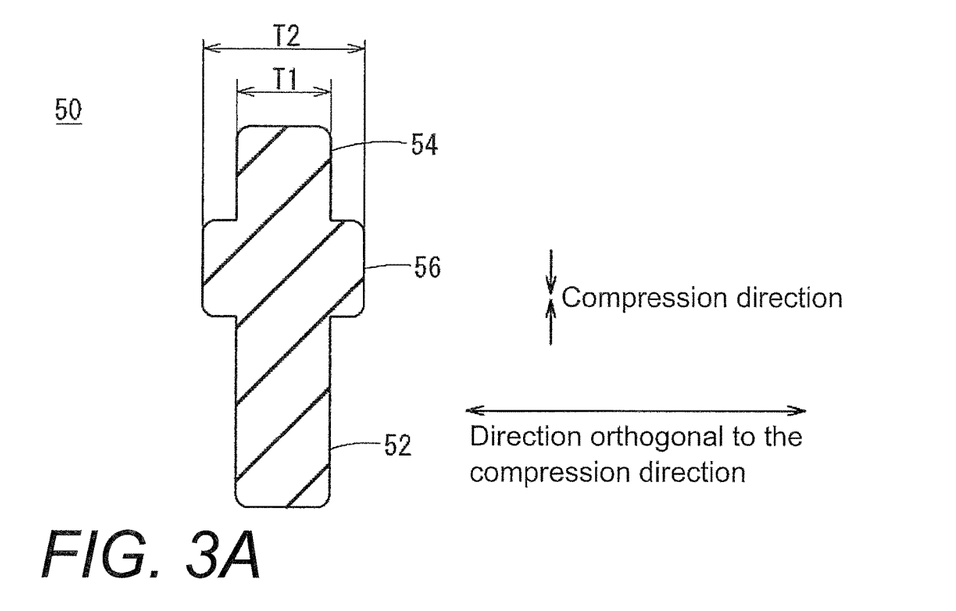
FIG. 3A is a cross sectional view of a rib-less part of a seal member.
Figure 3B:
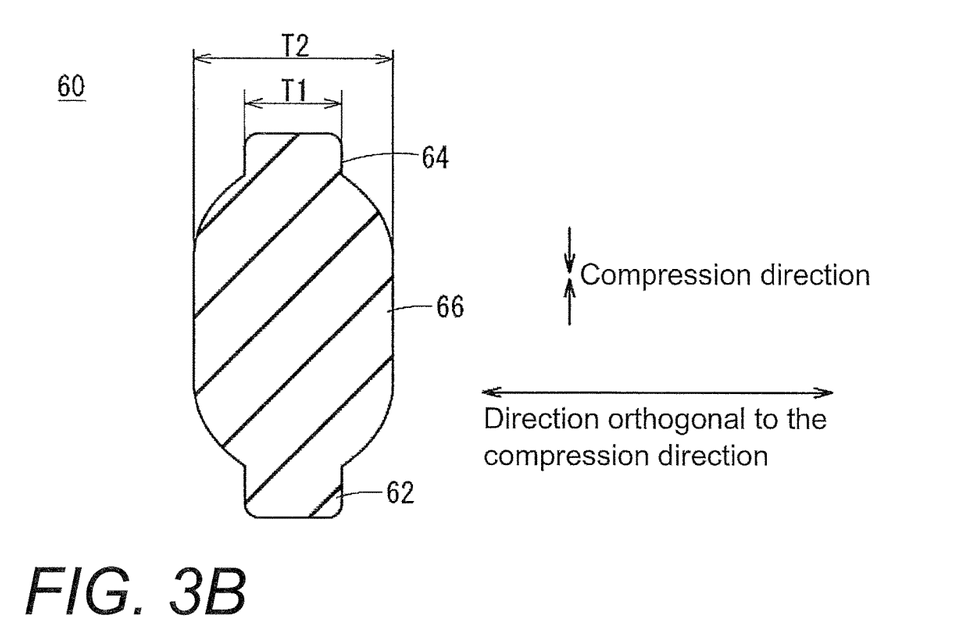
FIG. 3B is a cross sectional view of a ribbed part of the seal member.

Herein, the rib-less part 50 and the ribbed part 60 will be explained with reference to FIGS. 3A and 3B. In FIGS. 3A and 3B, the upward and downward direction is the compression direction, by fastening, of the seal member 16, and the left and right direction is the direction orthogonal to the compression direction. In addition, the vertical direction in the drawing is the axial direction of the seal member 16.

As shown in FIG. 3A, the rib-less part 50 has a bottom portion 52 and a head portion 54 at each end in the compression direction, and has a protrusion 56 in an intermediate position between the bottom portion 52 and the head portion 54. The bottom portion 52 and the protrusion 56 are configured to project at inner and outer circumferences of the seal member 16. The head portion 54 has a thickness T1 in the direction orthogonal to the compression direction. The protrusion 56 has a thickness T2 in the direction orthogonal to the compression direction (T1<T2). In other words, the thickness is increased (thickened) in the order of the head portion 54 and the protrusion 56. The greater portion of the rib-less part 50 has the thickness T1.

As shown in FIG. 3B, the ribbed part 60 has a bottom portion 62 and a head portion 64 at each end in the compression direction, and has a rib 66 extending from the bottom portion 62 to the head portion 64. The rib 66 is configured to project at the inner and outer circumferences of the seal member 16. The rib 66 is formed in substantially a cylindrical shape an axis of which extends in the compression direction of the seal member 16, and then, an upper portion of the cylindrical shape is reduced in diameter toward the head portion 64. The head portion 64 has a thickness T1 in the direction orthogonal to the compression direction. The rib 66 has a thickness T2 in the direction orthogonal to the compression direction (T1<T2). In other words, the thickness is increased (thickened) in the order of the head portion 64 and the rib 66. The greater portion of the ribbed part 60 has the thickness T2.

The thickness T1 of the head portion 54 of the rib-less part 50 is the same as the thickness T1 of the head portion 64 of the ribbed part 60. The thickness T2 of the protrusion 56 of the rib-less part 50 is the same as the thickness T2 of the rib 66 of the ribbed part 60. In the rib-less part 50, the protrusion 56 of the thickness T2 is formed only in the intermediate portion between the bottom portion 52 and the head portion 54, while, in the ribbed part 60, the rib 66 is formed so as to extend from the bottom portion 62 to the head portion 64. Like this, since the rib-less part 50 has a thin portion more than the ribbed part 60, the thickness of the rib-less part 50 is smaller than the thickness of the ribbed part 60 when comparing average thicknesses in the direction orthogonal to the compression direction.

The thickness T2 with respect to the protrusion 56 of the rib-less part 50 and the rib 66 of the ribbed part 60 is slightly larger than the width W of the seal member holding groove 42 shown in FIG. 2. With this configuration, when the seal member 16 is fitted into in the seal member holding groove 42, the inner and outer peripheral surfaces of the protrusion 56 and the rib 66 come into pressure contact with an inner wall surface of the seal member holding groove 42. Therefore, the seal member 16 is hardly come out of the seal member holding groove 42. Like this, the fit of the protrusion 56 and the ribbed part 60 relative to the seal member holding groove 42 is an interference fit, and the protrusion 56 and the ribbed part 60 function also as a coming-out prevention device.

Figure 4:
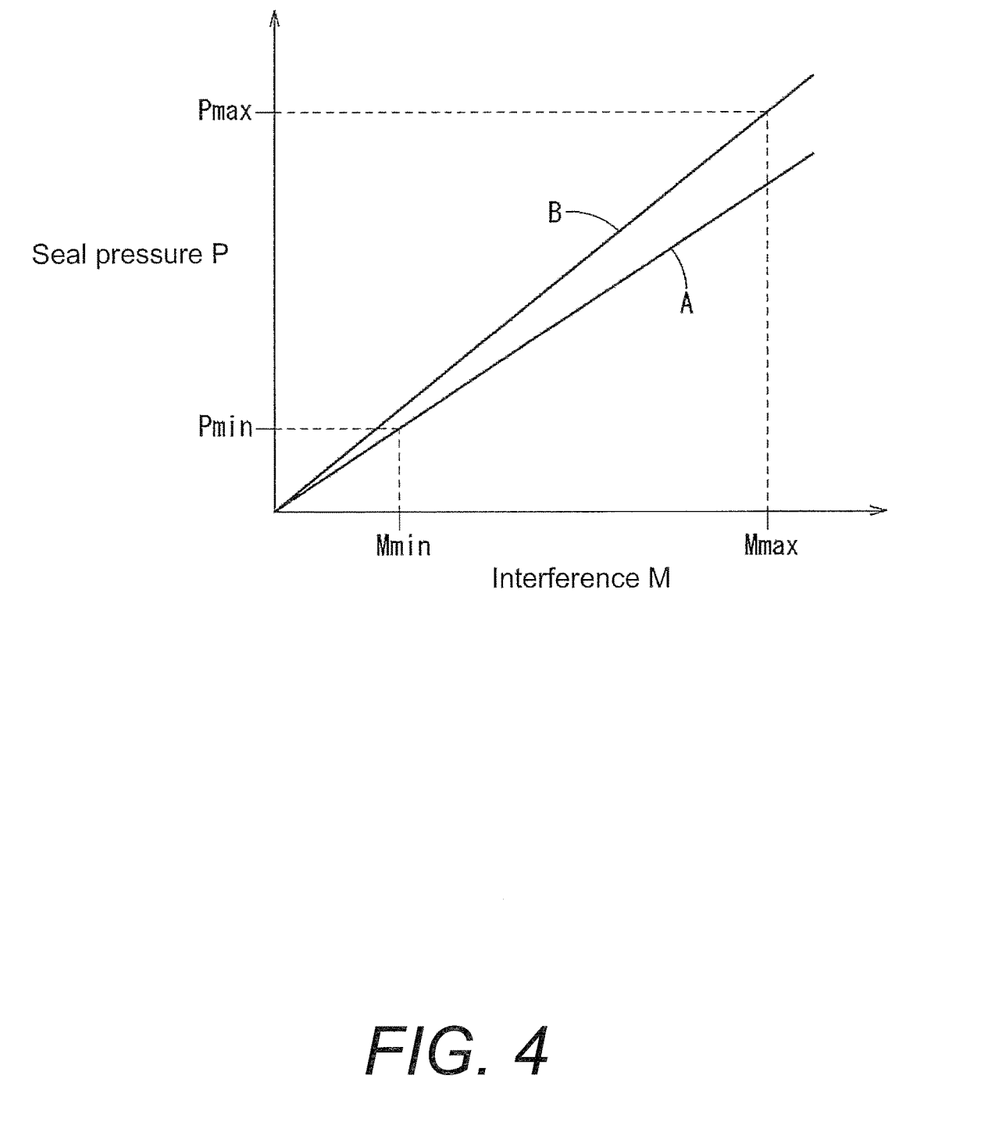
FIG. 4 is a diagram for explaining the relationship between interference and a seal pressure.

Herein, the difference in reaction force in the compression direction between the rib-less part 50 and the ribbed part 60 will be explained with reference to FIG. 4. In FIG. 4, the horizontal axis indicates interference M of the seal member 16, and the vertical axis indicates a seal pressure P. The interference M may be considered as a compression amount, namely, compression force, and the seal pressure P may be considered as reaction force of the seal member 16. A characteristic A shown in FIG. 4 is a characteristic of the interference M—the seal pressure P of the rib-less part 50, and a characteristic B is a characteristic of the interference M—the seal pressure P of the ribbed part 60. As apparent from the characteristics A and B, when comparing the same interference M (the compression force), the seal pressure P (the reaction force) of the rib-less part 50 is smaller than the seal pressure P (the reaction force) of the ribbed part 60. In other words, when comparing the rib-less part 50 with the ribbed part 60, the reaction force in the compression direction is smaller by the amount that the rib 66 is not formed.

By the way, when designing the seal member 16, the seal pressure P is required to be set in an optimum range. There is a minimum seal pressure Pmin essential to a seal and a maximum seal pressure Pmax under which the case 12 or the cover 14 may be damaged due to the reaction force of the seal member 16. When setting the interference M of the seal member 16, a minimum interference Mmin corresponding to the minimum seal pressure Pmin can be set, based on the characteristic A of the rib-less part 50. Moreover, based on the characteristic B of the ribbed part 60, a maximum interference Mmax corresponding to the maximum seal pressure Pmax can be set. It is preferable that the interference M of the seal member 16 is set to be between the minimum interference Mmin and the maximum interference Mmax.

Figure 5A:
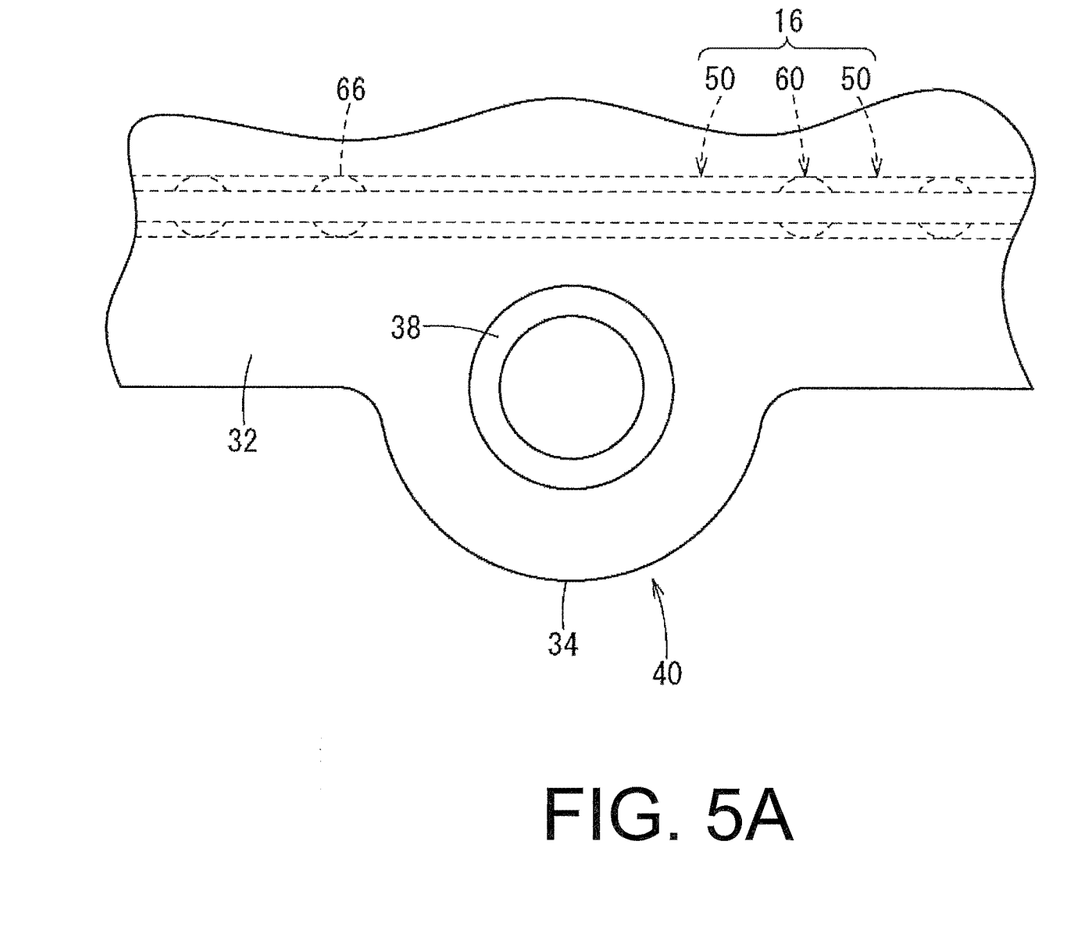
FIG. 5A is a plan view of the fastening region of the casing.

Next, the arrangement of the rib-less part 50 and the ribbed part 60 will be explained with reference to FIGS. 5A and 5B. FIG. 5A shows the cover side flange 32 in a state where the bolt 18 and the nut 20 are removed, and the seal member 16 in perspective view. Further, in FIG. 5B, the upward and downward direction corresponds to the magnitude of the reaction force of the seal member 16 and the compression force acting on the seal member 16, and it is indicated that the reaction force and compression force is larger as going upward. Moreover, the left and right direction corresponds to the positions of each part in the axial direction (the circumferential direction) of the seal member 16. A characteristic C indicates the compression force corresponding to the positions of the seal member 16. A characteristic D indicates the reaction force corresponding to the positions of the seal member 16. The positions in the axial direction of each part of the seal member 16 shown in FIG. 5A correspond to the positions in the axial direction of the characteristics C and D of FIG. 5B. In addition, the characteristics C, D shown in FIG. 5B indicate, while deforming, the tendencies of changes of the reaction force and the compression force.

Figure 5B:
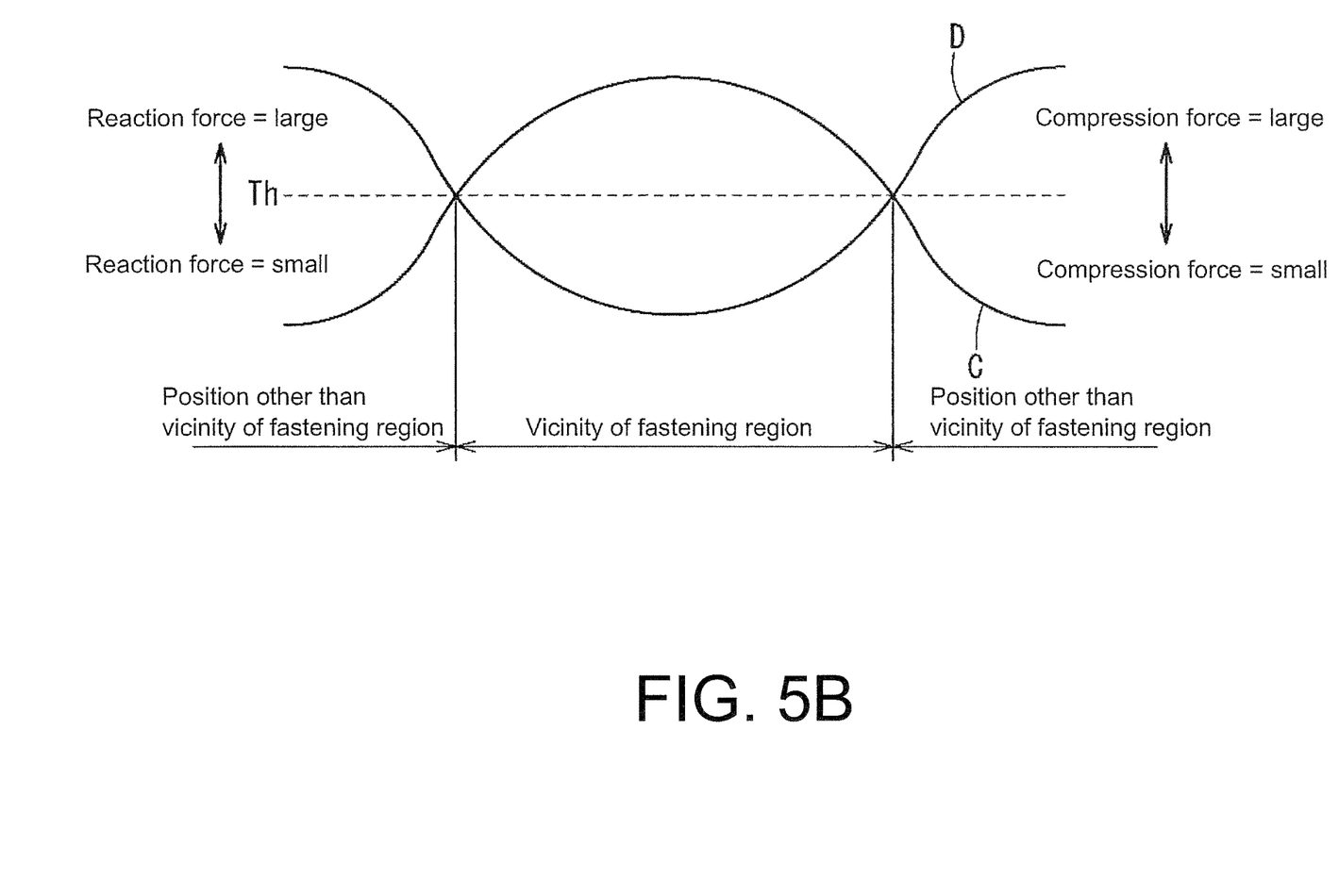
FIG. 5B is a diagram for explaining reaction force and compression force around the fastening region.

Like the characteristic C shown in FIG. 5B, the compression force acting on the seal member 16 increases as approaching the fastening region 40, and the compression force acting on the seal member 16 decreases as being separated apart from the fastening region 40. In this embodiment, a range in which the compression force acting on the seal member 16 is equal to or more than a predetermined threshold value Th is referred to as the vicinity of the fastening region 40, and a range in which the compression force is less than the predetermined threshold value Th is referred to as the position other than the vicinity of the fastening region 40. In the embodiment shown in FIG. 5A, the position relative to the fastening region 40 is referred to as the vicinity of the fastening region 40. Then, the rib 66 is not formed in the seal member 16 located in the vicinity of the fastening region 40, and the rib 66 is formed in the seal member 16 located in the position other than the vicinity of the fastening region 40. In other words, the seal member 16 located in the vicinity of the fastening region 40 is formed of only the rib-less part 50, and the seal member 16 located in the position other than the vicinity of the fastening region 40 is formed of the rib-less part 50 and the ribbed part 60.

It is preferable that, in the position other than the vicinity of the fastening region 40, the ribs 66 are arranged at predetermined spaced intervals along the seal member 16. In this case, the reaction force is capable of being adjusted by adjusting the intervals of the ribs 66. Herein, the ribs 66 may be arranged at irregularly spaced intervals. In this case, some effects can be expected in that the reaction force of the seal member 16 located in the position other than the vicinity of the fastening region 40 and the reaction force of the seal member 16 located in the vicinity of the fastening region 40 are varied.

When manufacturing the seal structure according to this embodiment, the seal member 16 is disposed inwardly of the casing 10 from the fastening regions 40, and the seal member 16 is press fitted into the seal member holding groove 42. Then, the rib-less parts 50 are arranged in the vicinity of the fastening regions 40 and the ribbed parts 60 are arranged in the positions other than the vicinities of the fastening regions 40 such that the reaction force in the compression direction of the seal member 16 to be arranged in the vicinities of the fastening regions 40 becomes smaller than the reaction force in the compression direction of the seal member 16 to be arranged in the positions other than the vicinities of the fastening regions 40. After that, the cover 14 is put on the casing 12, and each of the fastening regions 40 is fastened with the bolts 18 and the nuts 20.

As explained above, the seal structure according to this embodiment, the seal member 16 is arranged between the case 12 of the casing 10 and the cover 14 of the casing 10. Further, the plurality of fastening regions 40 for fastening the case 12 and the cover 14 are formed in the outer periphery of the casing 10, and the seal member 16 is arranged inwardly of the casing 10 from the fastening regions 40. Then, the reaction force in the compression direction of the seal member 16 located in the vicinities of the fastening regions 40 is smaller than the reaction force in the compression direction of the seal member 16 located in the positions other than the vicinities of the fastening regions 40. According to this embodiment, since the reaction force in the compression direction of the seal member 16 located in the vicinities of the fastening regions 40 is smaller than the reaction force in the compression direction of the seal member 16 located in the positions other than the vicinities of the fastening regions 40, the casing 10 is not damaged even if the compression force of the fastening regions 40 is increased in order to prevent the opening from being produced between the fastening regions 40 neighboring to each other. Thus, the required strength of the casing 10 can be reduced and an inexpensive material can be employed as a material of the casing 10 whereby manufacturing costs of the casing 10 can be reduced.

In this embodiment, the seal member 16 located in the vicinities of the fastening regions 40 has the thickness T1 (first thickness) in the direction orthogonal to the compression direction. The seal member 16 located in the positions other than the vicinities of the fastening regions 40 has the thickness T2 (second thickness) in the direction orthogonal to the compression direction. Then, the (first) thickness T1 is thinner than the (second) thickness T2. According to this embodiment, the reaction force in the compression direction of the seal member 16 can be varied with such a simple configuration that the thickness of the seal member 16 is partially varied. Thus, the manufacturing costs of the seal member 16 can be reduced.

In this embodiment, the seal member 16 is held in the seal member holding groove 42 which is provided on at least one of the case 12 and the cover 14. The seal member 16 located in the positions other than the vicinities of the fastening regions 40 has the ribs 66 extending in the compression direction. The ribbed part 60 having the rib 66 has the (second) thickness T2 in the direction orthogonal to the compression direction, and the (second) thickness T2 is larger than the width of the seal member holding groove 42. According to this embodiment, since the rib 66 is in an interference fit relationship with the seal member holding groove 42, it becomes easy to position the seal member 16 in a position to be sealed. Therefore, work efficiency in assembling the casing 10 can be improved.

In the seal method according to this embodiment, the seal member 16 is arranged inwardly of the casing 10 from the fastening regions 40 in which the case 12 and the cover 14 are fastened. Then, the reaction force in the compression direction of the seal member 16 located in the vicinities of the fastening regions 40 is smaller than the reaction force in the compression direction of the seal member 16 located in the positions other than the vicinities of the fastening regions 40. Like this, since the reaction force in the compression direction of the seal member 16 located in the vicinities of the fastening regions 40 is smaller than the reaction force in the compression direction of the seal member 16 located in the positions other than the vicinities of the fastening regions 40, the casing 10 may not be damaged even if the compression force is increased in order for preventing the opening from being produced between the fastening regions 40 neighboring to each other or for other purpose.

A seal structure according to the present embodiment is of the type that has a seal member arranged between a case of a casing and a cover of the casing, comprises a plurality of fastening regions for fastening the case and the cover, being formed in an outer periphery of the casing, and the seal member being arranged inwardly of the casing from the fastening regions, wherein reaction force in the compression direction of the seal member located in the vicinities of the fastening regions is smaller than reaction force in the compression direction of the seal member located in positions other than the vicinities of the fastening regions. According to the present embodiment, since the reaction force in the compression direction of the seal member located in the vicinities of the fastening regions is smaller than the reaction force in the compression direction of the seal member located in the positions other than the vicinities of the fastening regions, the casing is not damaged even if the compression force of the fastening regions is increased in order to prevent an opening from being produced between the fastening regions neighboring to each other. Thus, the required strength of the casing may be reduced and an inexpensive material may be employed as a material of the casing whereby manufacturing costs of the casing may be reduced.

In the present embodiment, it is preferable that the seal member located in the vicinities of the fastening regions has a first thickness in the direction orthogonal to the compression direction, and the seal member located in the positions other than the vicinities of the fastening regions has a second thickness in the direction orthogonal to the compression direction, wherein the first thickness is thinner than the second thickness. According to the present embodiment, the reaction force in the compression direction of the seal member can be varied by such a simple configuration that the thickness of the seal member is partially varied. Thus, the manufacturing costs of the seal member can be reduced.

In the present embodiment, preferably, the seal member is held in a seal member holding groove which is provided on at least one of the case and the cover, and the seal member located in the positions other than the vicinities of the fastening regions is provided with a rib extending in the compression direction, wherein a part provided with the rib has the second thickness in the direction orthogonal to the compression direction, and the second thickness is larger than a width of the seal member holding groove. According to the present embodiment, since the rib is in an interference fit relationship with the seal member holding groove, it becomes easy to position the seal member in a sealing position. Therefore, work efficiency in assembling the casing can be improved.

A seal method according to the present embodiment is a seal method for providing a seal between a case of a casing and a cover of the casing by a seal member, wherein the seal member is arranged inwardly of the casing from a fastening region in which the case and the cover are fastened, and reaction force in the compression direction of the seal member located in the vicinity of the fastening region is smaller than the reaction force in the compression direction of the seal member located in a position other than the vicinity of the fastening region. According to the present embodiment, since the reaction force in the compression direction of the seal member located in the vicinity of the fastening region is smaller than the reaction force in the compression direction of the seal member located in a position other than the vicinity of the fastening region, the casing is not damaged even if the compression force is increased in order for preventing an opening from being produced between the fastening regions neighboring to each other or for other purpose.

According to the present embodiment, since the reaction force in the compression direction of the seal member located in the vicinity of the fastening region is smaller than the reaction force in the compression direction of the seal member located in the position other than the vicinity of the fastening region, the casing is not damaged even if the compression force of the fastening region is increased.

Obviously, numerous modifications and variations of the present invention are possible in light of the above teachings. It is therefore to be understood that within the scope of the appended claims, the invention may be practiced otherwise than as specifically described herein.

What is claimed is:

1. A seal structure of the type that has a seal member arranged between a case of a casing and a cover of the casing, comprising:

a plurality of fastening regions for fastening the case and the cover, being formed in an outer periphery of the casing; and the seal member being arranged inwardly of the casing from the fastening regions, wherein reaction force in the compression direction of the seal member located in the vicinities of the fastening regions is smaller than reaction force in the compression direction of the seal member located in positions other than the vicinities of the fastening regions, wherein the seal member located in the fastening regions has a first thickness in the direction orthogonal to the compression direction, and the seal member located in the positions other than the fastening regions has a second thickness in the direction orthogonal to the compression direction, and wherein the first thickness is thinner than the second thickness.

2. A seal structure according to claim 1, wherein the seal member located in the vicinities of the fastening regions has the first thickness in the direction orthogonal to the compression direction, and the seal member located in the positions other than the vicinities of the fastening regions has the second thickness in the direction orthogonal to the compression direction.

3. A seal structure according to claim 2, wherein the seal member is held in a seal member holding groove which is provided on at least one of the case and the cover, and the seal member located in the positions other than the vicinities of the fastening regions has a rib extending in the compression direction, and wherein a part having the rib has the second thickness in the direction orthogonal to the compression direction, and the second thickness is larger than a width of the seal member holding groove.

4. A seal method for providing a seal between a case of a casing and a cover of the casing by a seal member, wherein the seal member is arranged inwardly of the casing from a fastening region in which the case and the cover are fastened, and reaction force in the compression direction of the seal member located in the vicinity of the fastening region is smaller than the reaction force in the compression direction of the seal member located in a position other than the vicinity of the fastening region, wherein the seal member located in the fastening region has a first thickness in the direction orthogonal to the compression direction, and the seal member located in the position other than the fastening region has ribs each having a second thickness in the direction orthogonal to the compression direction, and wherein the first thickness is thinner than the second thickness.

5. A seal structure comprising:

a seal body to be sandwiched between a case and a cover and to be provided between a space and a plurality of fastening regions, the space being to be formed by and between the case and the cover, the case and the cover being to be fastened at the plurality of fastening regions to compress the seal body in a compression direction, the seal body comprising:

a plurality of first regions corresponding to the plurality of fastening regions, respectively;

a plurality of second regions, each of the plurality of second regions being provided between one of the plurality of first regions and another of the plurality of first regions juxtaposed to the one of the plurality of first regions; and a structure such that reaction force in the compression direction in the seal body located at the plurality of first regions being smaller than reaction force in the compression direction in the seal body located in the plurality of second regions in a state where the case and the cover are fastened at the plurality of fastening regions, wherein the seal body located in the plurality of first regions has a first thickness in the direction orthogonal to the compression direction, and the seal body located in the plurality of second regions has ribs each having a second thickness in the direction orthogonal to the compression direction, and wherein the first thickness is thinner than the second thickness.

6. A seal structure according to claim 5, wherein the ribs extend in the compression direction, and wherein a part having the rib has the second thickness in the direction orthogonal to the compression direction, and the second thickness is larger than a width of the seal holding groove.

7. A seal method comprising:

providing a seal between a case and a cover;

connecting the case and the cover with a fastener such that a seal body is provided between a space and a plurality of fastening regions, the space being to be formed by and between the case and the cover, reaction force in a compression direction of the seal body located in the vicinity of the fastening regions is smaller than the reaction force in the compression direction of the seal body located in a position other than the vicinity of the fastening regions, wherein the seal body located in the fastening regions has a first thickness in the direction orthogonal to the compression direction, and the seal body located in the position other than the fastening regions has ribs each having a second thickness in the direction orthogonal to the compression direction, and wherein the first thickness is thinner than the second thickness.

8. A seal structure according to claim 1, wherein the seal member located in the positions other than the fastening regions has ribs each having the second thickness in the direction orthogonal to the compression direction.

9. A seal structure according to claim 8, wherein the seal member does not have ribs having the second thickness in the direction orthogonal to the compression direction in areas overlapping the fastening regions about the outer periphery of the casing.

10. A seal method according to claim 4, wherein the seal member does not have ribs having the second thickness in the direction orthogonal to the compression direction in an area overlapping the fastening region about an outer periphery of the casing.

11. A seal structure according to claim 5, wherein the seal body does not have ribs having the second thickness in the direction orthogonal to the compression direction in the plurality of first regions overlapping the plurality of fastening regions about a periphery of the seal body.

12. A seal method according to claim 7, wherein the seal body does not have ribs having the second thickness in the direction orthogonal to the compression direction in an area overlapping the fastening regions about a periphery of the seal body.

* * * * *